US012260646B1

(12) United States Patent
Gravelle et al.

(10) Patent No.: US 12,260,646 B1
(45) Date of Patent: Mar. 25, 2025

(54) BATTERY-POWERED IMAGE CAPTURE DEVICES

(71) Applicant: SimpliSafe, Inc., Boston, MA (US)

(72) Inventors: Norbert G. Gravelle, Ashland, MA (US); Aditya P. Goswami, Acton, MA (US); John Sevinsky, Shrewsbury, MA (US); Qichao Shao, Jamaica Plain, MA (US); Kevin Klemm, Waltham, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/472,907

(22) Filed: Sep. 22, 2023

Related U.S. Application Data

(60) Provisional application No. 63/482,426, filed on Jan. 31, 2023.

(51) Int. Cl.
  *G06V 20/52* (2022.01)
  *G06F 1/26* (2006.01)
  *G06V 40/10* (2022.01)

(52) U.S. Cl.
  CPC .............. *G06V 20/52* (2022.01); *G06F 1/26* (2013.01); *G06V 40/103* (2022.01)

(58) Field of Classification Search
  None
  See application file for complete search history.

(56) References Cited

U.S. PATENT DOCUMENTS

| 9,906,722 B1 | 2/2018 | Gigot |
| 11,257,226 B1 | 2/2022 | Solh et al. |
| 11,336,869 B2 | 5/2022 | Yao et al. |
| 2019/0311201 A1 | 10/2019 | Selinger et al. |
| 2021/0329193 A1 | 10/2021 | Wu et al. |
| 2021/0360145 A1 | 11/2021 | Laurans et al. |
| 2021/0360446 A1* | 11/2021 | Laurans ................. H04N 7/183 |

FOREIGN PATENT DOCUMENTS

| CN | 105472318 A | * 4/2016 |
| CN | 113507567 A | * 10/2021 |
| WO | 2018/053382 A1 | 3/2018 |

OTHER PUBLICATIONS

International Search Report/Written Opinion Corresponding to PCT/US2024/013453 mailed Jun. 25, 2024.

* cited by examiner

*Primary Examiner* — James M Anderson, II
(74) *Attorney, Agent, or Firm* — Finch & Maloney PLLC

(57) ABSTRACT

A method is provided. The method includes causing, by a controller of a device, at least one processor of the device distinct from the controller to power on in response to receipt of a signal from a sensor of the device configured to detect motion within a field of view; analyzing, by the at least one processor, one or more images from an image sensor of the device to identify an image of a person; sending, by the at least one processor, a trigger to a base station in response to identification of the image of the person; and booting, by the at least one processor, a multitasking operating system of the device after sending the trigger to the base station.

17 Claims, 13 Drawing Sheets

BATTERY-POWERED IMAGE CAPTURE DEVICES

CROSS REFERENCE TO RELATED APPLICATIONS

This application claims priority under 35 U.S.C. § 119 (e) to U.S. Provisional Application Ser. No. 63/482,426, titled "BATTERY-POWERED IMAGE CAPTURE DEVICES," filed Jan. 31, 2023, which is hereby incorporated herein by reference in its entirety.

TECHNICAL FIELD

Aspects of the technologies described herein relate to security systems and methods and more particularly to battery-powered image capture devices.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices. The use of battery-powered cameras can increase the availability of various camera functions, such as during power outages, and reduce installation costs by avoiding the need to run power cabling to the camera.

SUMMARY

Examples described herein are directed to systems and methods of conserving power within security devices without inhibiting performance of monitoring and alarming functionality. At least one example is directed to a method. The method includes causing, by a controller of a device, at least one processor of the device distinct from the controller to power on in response to receipt of a signal from a sensor of the device configured to detect motion within a field of view; analyzing, by the at least one processor, one or more images from an image sensor of the device to identify an image of a person; sending, by the at least one processor, a trigger to a base station in response to identification of the image of the person; and booting, by the at least one processor, a multitasking operating system of the device after sending the trigger to the base station.

Systems and computer-readable media including instructions to execute the methods described herein are also contemplated.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

DETAILED DESCRIPTION

Figure 1:
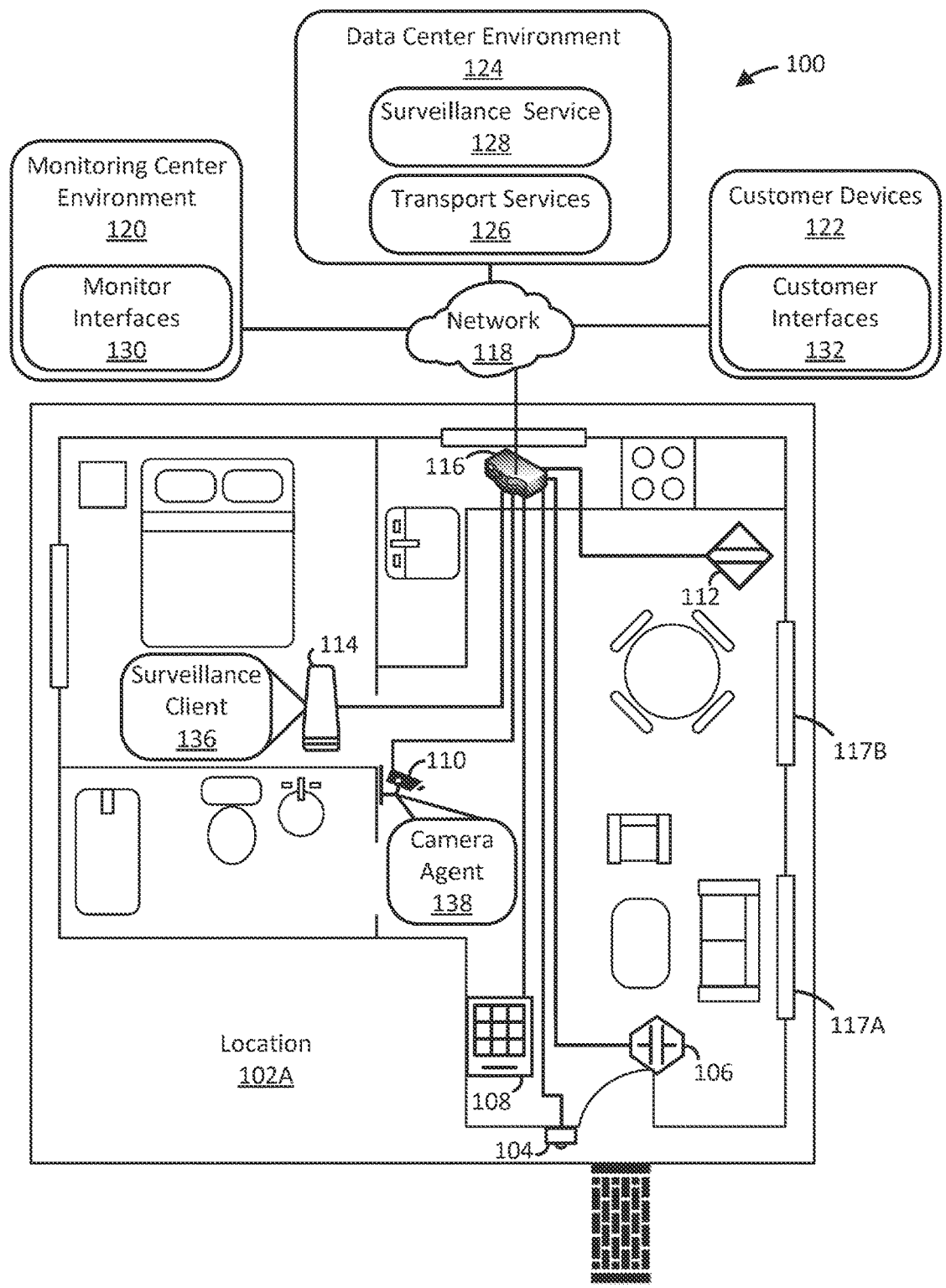
FIG. 1 is a schematic diagram of a security system, according to some examples described herein.

Some battery-powered image capture devices utilize two power modes: a low power mode and a normal operating mode. The low power mode can be used to permit basic operations, such as motion detection, while the normal operating mode can be used to perform additional functions, including image processing, data communications with remote devices and services, and audio/video services. For example, in some image capture devices, after an event of interest is detected other processing components are powered on and booted. In these examples, the image capture devices enter into a higher power operational mode that permits more extensive analysis and responses to images captured by one or more imaging sensors or cameras. This bifurcated approach to operations can enable an image capture device to utilize less power over time, depending on the characteristics of an environment monitored by the image capture device.

However, the bifurcated approach to operations described above can suffer from disadvantages in some situations. For instance, switching between low power operations and normal operations can result in delays that affect critical activation of, for example, system-wide security alarms. Consider, for example, a situation in which a low power motion sensor, such as a passive infrared (PIR) sensor, within an image capture device detects motion within its field of view. In this situation, the image capture device, in response to motion sensor readings, may enter a normal operating mode that enables the image capture device to determine whether the motion is an actual threat and, if so, acquire a recording of the camera's field of view, and upload the recording to a remote server for additional processing. Entry into this normal operating mode would, therefore, require the image capture device to initiate a threat detector (e.g., a camera and image analyzer), communication circuitry (e.g., a transceiver and associated driver(s)), and any supporting infrastructure (e.g., an operating system). Initiation of these features takes time and power. However, if the threat detector determines that no actual threat exists, the time and power required to initiate, at least, the communication circuitry and associated infrastructure is wasted. Further, even if the threat detector determines that an actual threat exists, initiating all of the features of a normal operating mode along with the threat detector can introduce delay in determining that the actual threat exists. This situation serves to illustrate that utilizing only two power modes may actually result in an overconsumption of power if, for example, not all of the services enabled by the normal operating mode are required to process and properly respond to a particular situation.

To this end, examples of the present disclosure provide for a more tailored approach in which images are analyzed and alarms are triggered using a real-time operating system prior to booting up a multitasking operating system to perform more advanced functions, such as uploading videos to remote devices and services. These examples consume power efficiently and decrease the amount of time needed to alarm an event.

For instance, in some examples, the image capture device is configured to perform an initial analysis of one or more images captured by an imaging sensor (e.g., camera) in response to a positive motion detection result from a motion detection sensor (e.g., a PIR sensor). The image capture device operates in the computer vision (CV) mode while performing the initial analysis of the images. The initial analysis includes, for example, identifying persons in the images captured by the imaging sensor in response to the positive motion detection result. In the CV mode of operation, an advanced processor (e.g., an SoC processor) executes a real-time operating system (RTOS), which supports the functionality of the initial analysis but does not necessarily support all functions of the image capture device, such as uploading videos to other devices. The RTOS is a limited context execution environment that is event-driven (e.g., triggered by motion detected by the motion sensor) and can be booted quickly (e.g., within approximately 0.5 seconds) upon receipt of a motion detection signal from the motion sensor, which helps to balance power consumption with the ability to promptly provide motion detection and/or threat notifications. By performing the initial analysis of images within the limited context of the RTOS, the image capture device can react quickly to motion detected by the motion sensor, such as by sending a motion trigger signal or event to other devices or sounding an audible alarm (e.g., a siren), before performing more computationally intensive actions, such as uploading videos. In these examples, the image capture device can be further configured to perform the additional, more computationally intensive functions, such as uploading videos, by booting and operating in a virtual machine (VM) mode of operation, as will be described further below. However, booting into the VM can consume more time (e.g., 2.5-4 seconds) than booting into the RTOS. As such, at least some examples described herein execute urgent operations via the RTOS provided that the RTOS can support the urgent operations.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. The monitored location 102A, the monitoring center environment 120, the data center environment 124, the one or more customer devices 122, and the communication network 118 include one or more computing devices (e.g., as described below with reference to FIG. 11). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of protocols suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, and so forth). Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIG. 4B). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alert state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alert condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alert condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Figures 2, 3:
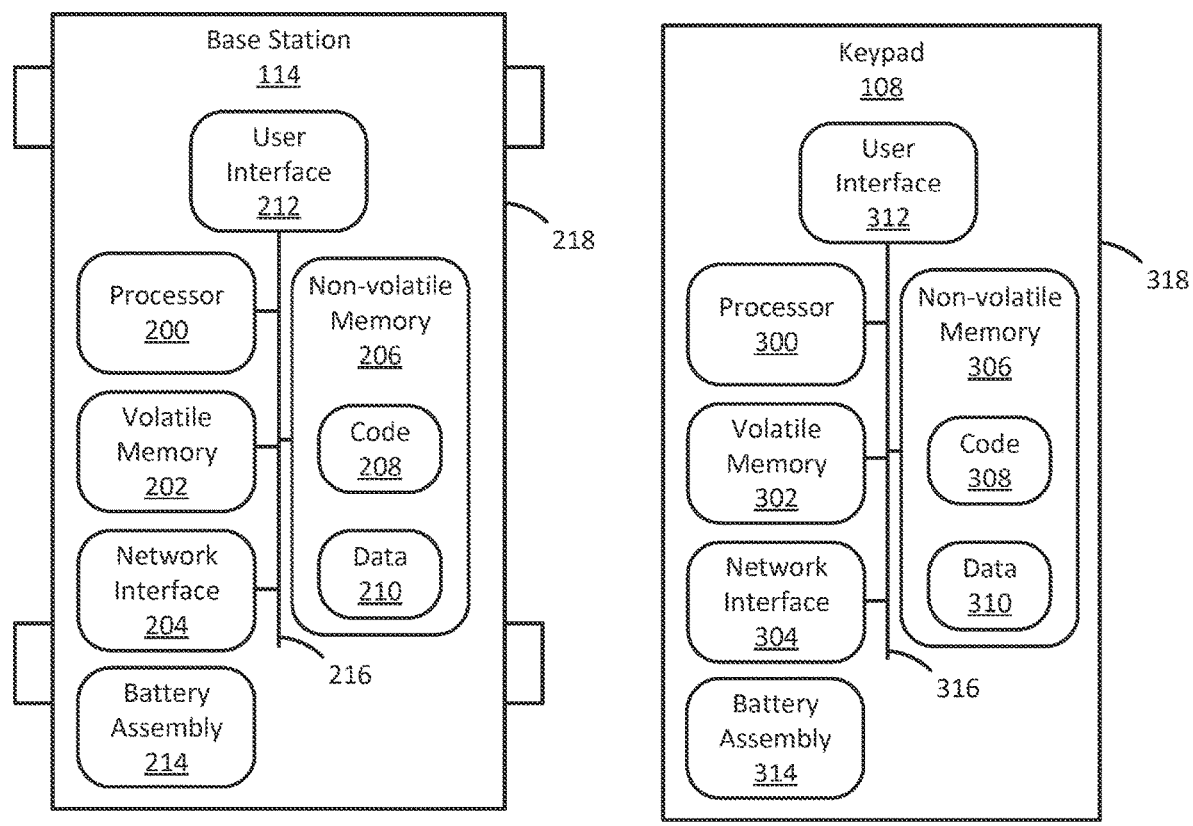
FIG. 2 is a schematic diagram of a base station, according to some examples described herein.
FIG. 3 is a schematic diagram of a keypad, according to some examples described herein.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random-access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1; the network 118 of FIG. 1; a PAN connection; a sub-GHz wireless, point-to-point network connection; etc.). For instance, in at least one example, the network interface 204 utilizes sub-GHz wireless networking to transmit messages (for example, wake messages, alarm messages, etc.) to the other computing devices. These messages can request streams of sensor data, trigger alarm states, or initiate other operations. Bands that the network interface 204 may utilize for sub-GHz wireless networking include, for example, a 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 dB siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116; a PAN connection; a point-to-point, sub-GHz wireless network connection; etc.).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

Figure 4A:
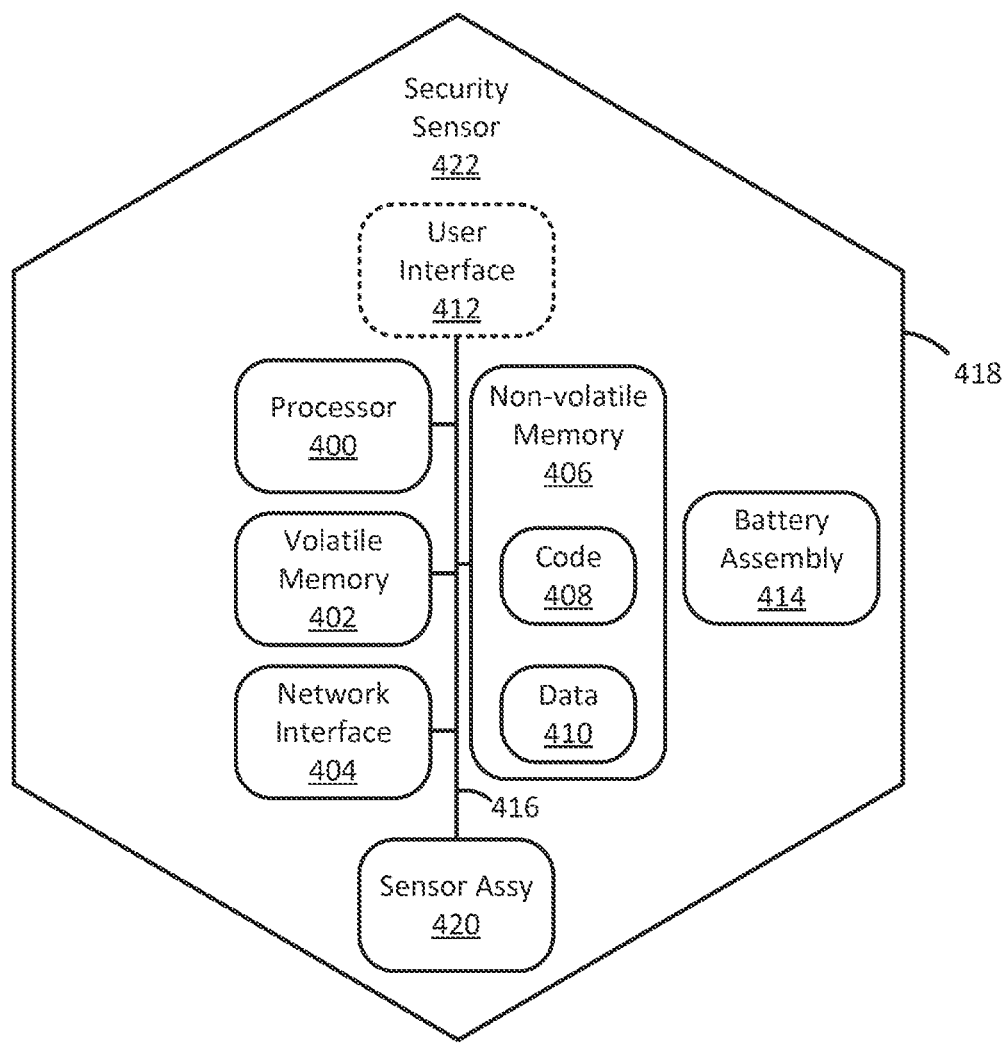
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and a temperature or thermographic sensor (e.g., a passive and/or active infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
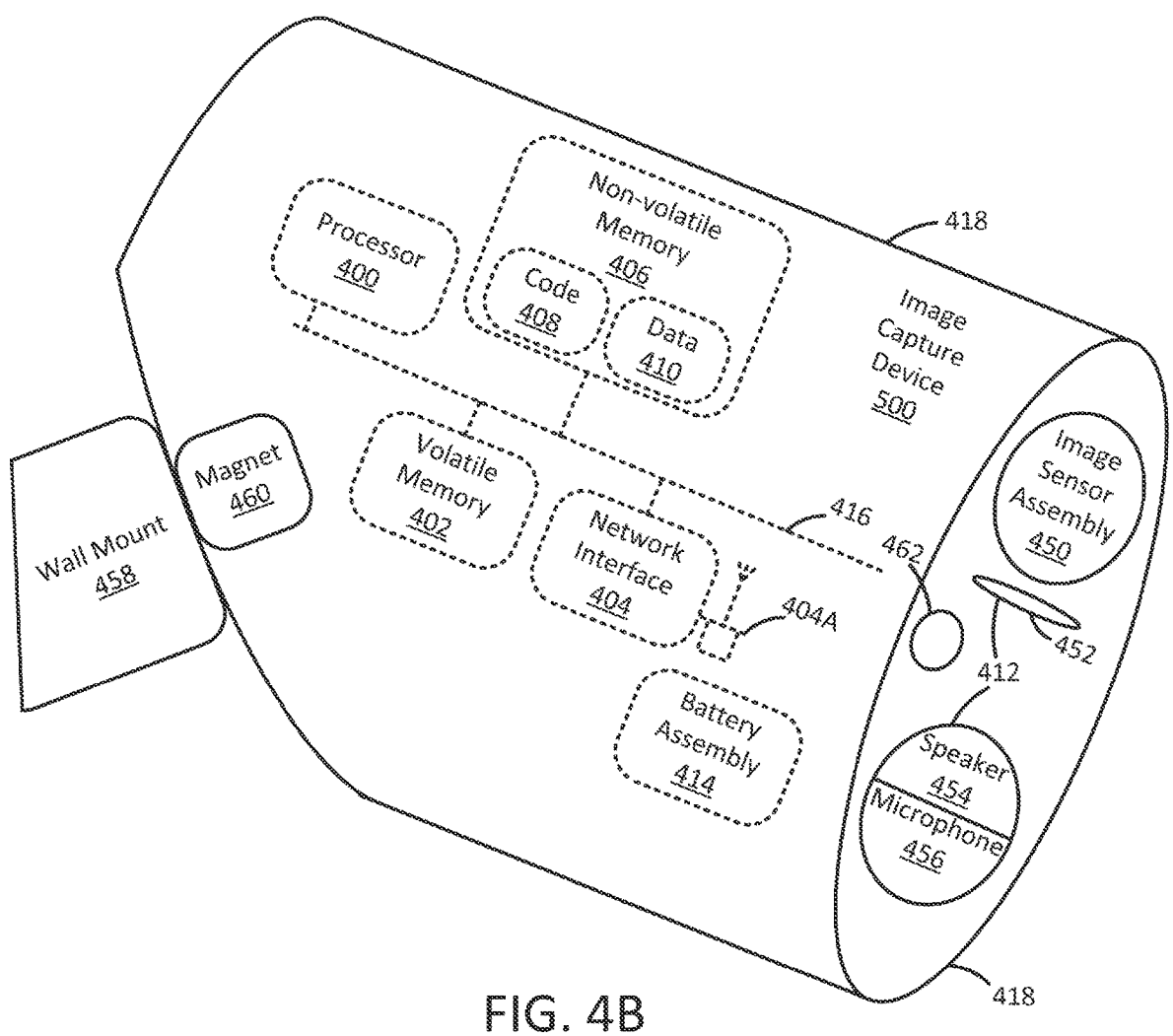
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. The network interface 404 includes a radio frequency (RF) transceiver 404A. The transceiver 404A can be used to communicate with location-based devices via a sub-GHz network. These features of the image capture device are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, a magnet 460, and a motion sensor 462. The image sensor assembly 450 may include a lens and an image sensor. The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 dB or louder. The PIR sensor 462 measures changes in the amount of ambient infrared (IR) light radiating from objects in the field of view; however, the PIR sensor 462 does not emit any light. As such, the PIR sensor 462 is useful for detecting motion represented by variations in temperature over time, such as caused by a person, animal, or object moving through the field of view. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alert via the siren) or streamed from the base station 114 (or one of the processes 130, 128 or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128 or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A.

Figure 4C:
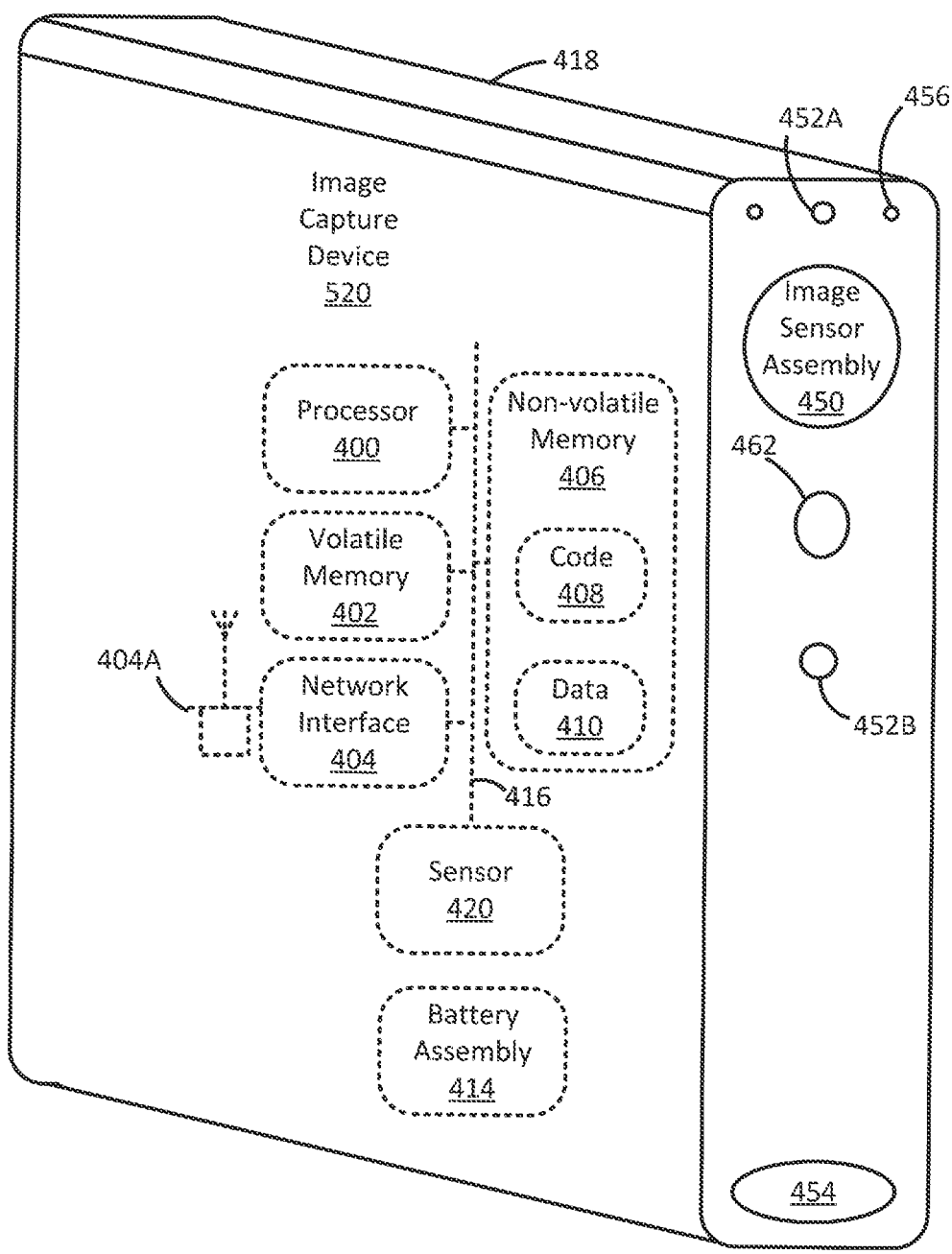
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404 (including the RF transceiver 404A), a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, a microphone 456, and a motion sensor 462 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and 452B, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
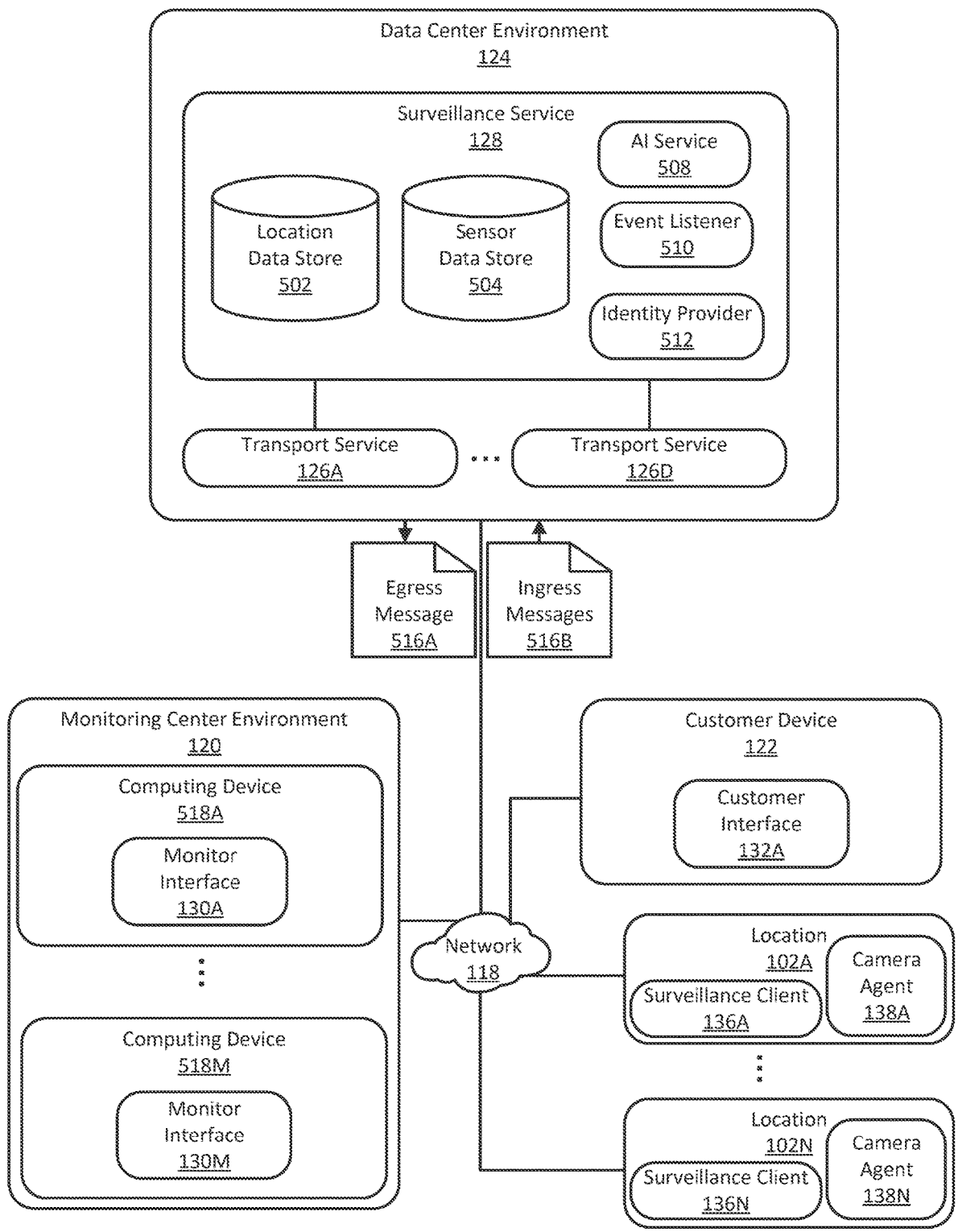
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) in association with identifiers of locations and timestamps at which the sensor data was acquired.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for events and, where an event is identified, execute one or more event handlers to process the event. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events within sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
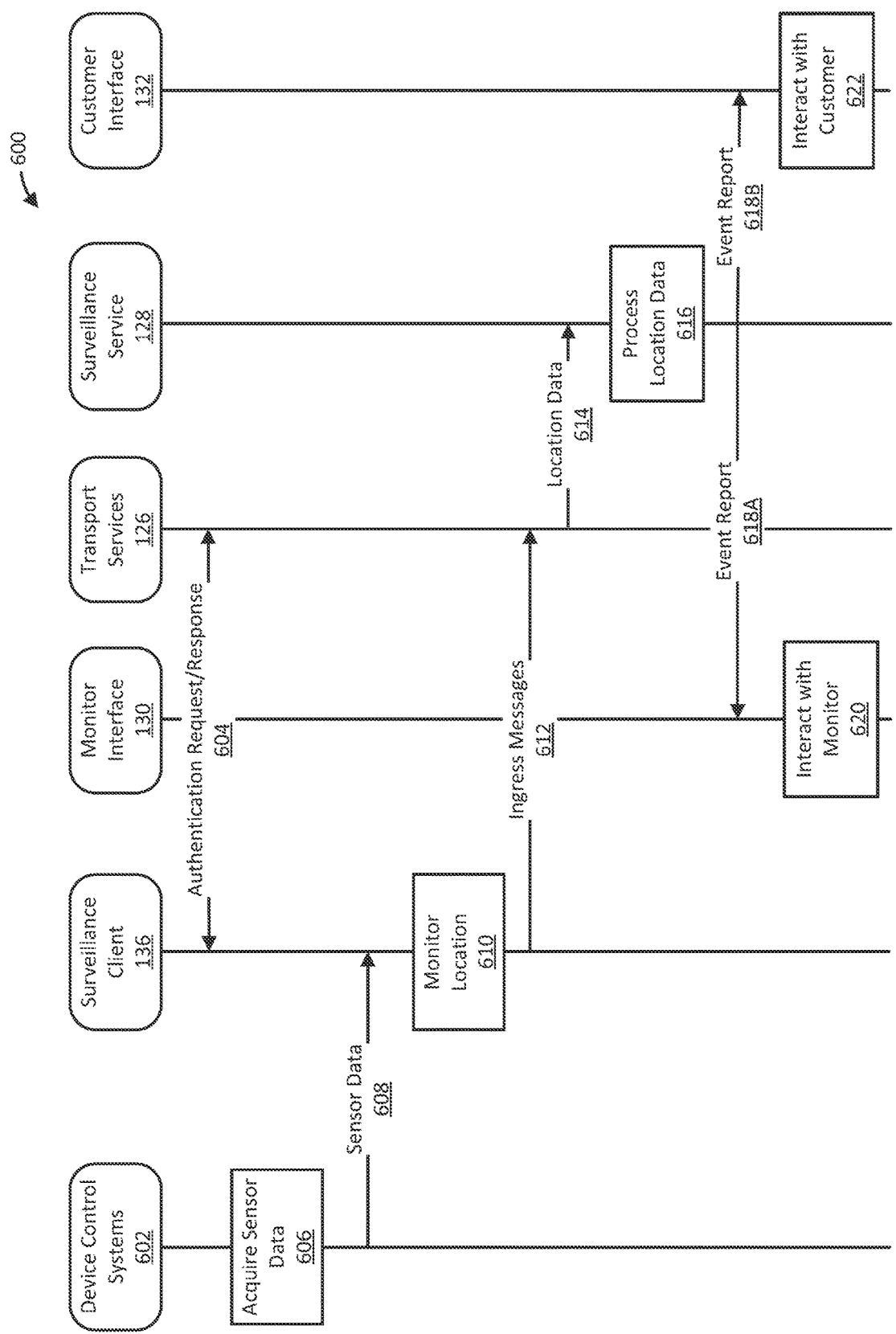
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIGS. 3-4C). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire 606 sensor data descriptive of a location (e.g., the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alerts (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria (e.g., movement within a particular zone combined with a threat score that exceeds a threshold value). The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more reportable events.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
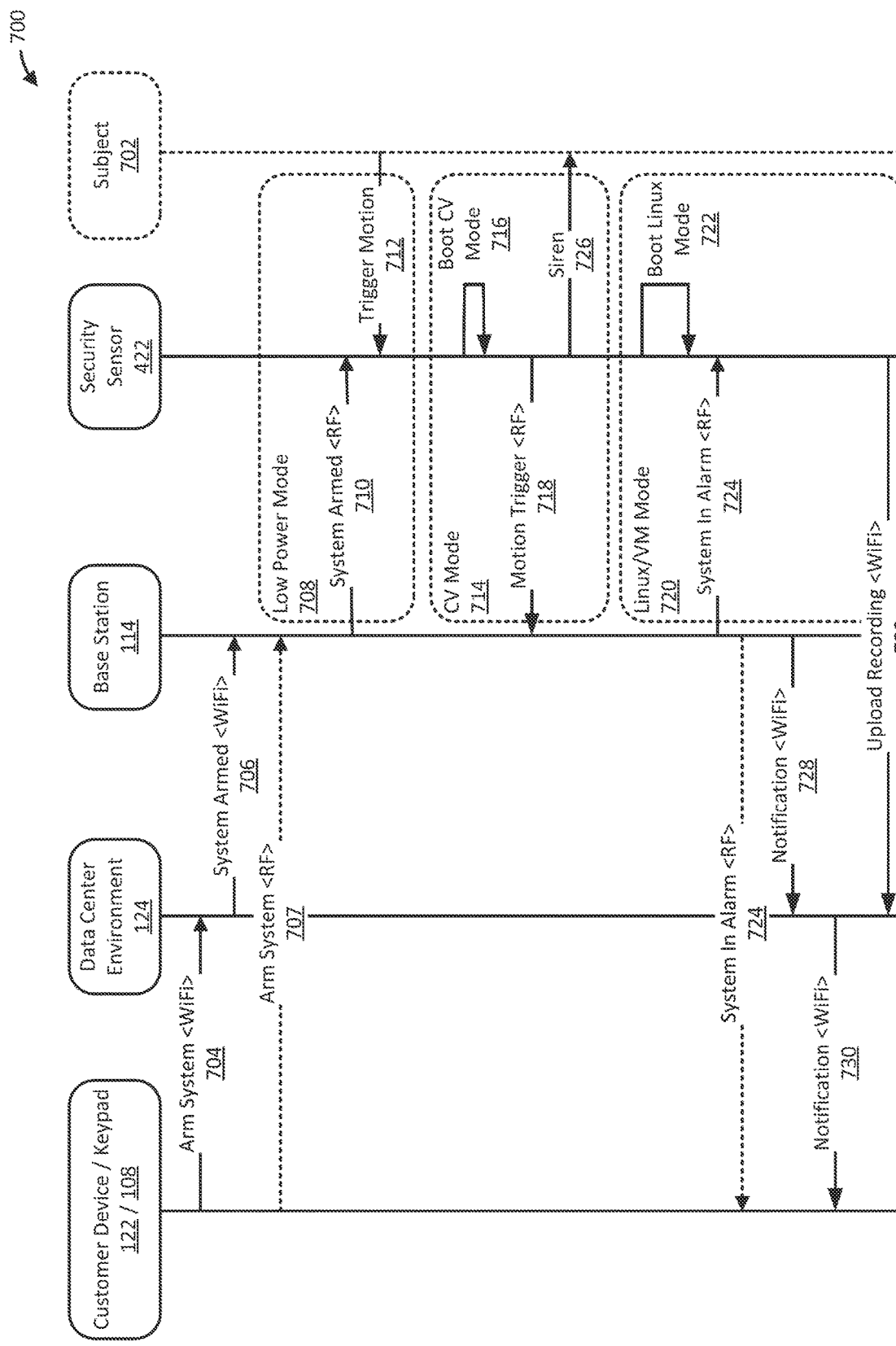
FIG. 7 is a sequence diagram of a process for operation of a security system including a battery-powered image capture device, according to some examples described herein.

Turning now to FIG. 7 a power control process 700 is illustrated as a sequence diagram. The process 700 can be executed, in some examples, by a security system (e.g., the security system 100 of FIG. 1). More specifically, in some examples, at least a portion of the processes 700 is executed by the location-based devices under the control of device control system (DCS) code (e.g., either the code 308 or 408) implemented by at least one processor (e.g., either of the processors 300 or 400 of FIGS. 3-4C). The DCS code can include, for example, a camera agent (e.g., the camera agent 138 of FIG. 1). At least a portion of the process 700 is executed by a base station (e.g., the base station 114 of FIG. 1) under control of a surveillance client (e.g., the surveillance client 136 of FIG. 1). At least a portion of the process 700, 800 is executed by a monitoring center environment (e.g., the monitoring center environment 120 of FIG. 1) under control of a monitor interface (e.g., the monitor interface 130 of FIG. 1). At least a portion of the process 700, 800 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 700, 800 is executed by a customer device (e.g., the customer device 122 of FIG. 1) under control of a customer interface (e.g., customer interface 132 of FIG. 1).

As discussed above, in an example, the image capture device 500 can acquire ambient light, generate frames of image data based on the acquired light, and communicate the frames to the base station 114, the data center environment 124, the monitor interfaces 130, and/or the customer interfaces 132 of the customer device 122. In some examples, the sensor assembly 450 of the image capture device 500 is battery-powered, such as by the battery assembly 414. The image capture device 500 includes a passive infrared (PIR) sensor 462 for detecting motion and at least one imaging sensor (e.g., a camera). The PIR sensor 462 measures changes in the amount of ambient infrared (IR) light radiating from objects in the field of view; however, the PIR sensor 462 does not emit any light. As such, the PIR sensor 462 is useful for detecting motion represented by variations in temperature over time, such as caused by a person, animal, or object moving through the field of view, but the PIR sensor 462 does not generally have enough resolution or processing capacity to identify objects. Thus, the PIR sensor 462 is suitable for generating a trigger or event for notifying other processing functions of the image capture device 500 that motion is detected in the field of view of the PIR sensor. For example, the PIR sensor 462 can be used to switch on a motion-activated security light and/or to cause another, higher-resolution imaging sensor, such as in a thermographic or visible light camera, to begin recording and processing video.

As illustrated in FIG. 7, in some examples, the process 700 starts with the customer device 122 sending an arm system signal 704 via, for example, WI-FI to the data center environment 124, and the data center environment 124, in turn, sending a corresponding arm signal 706 to the base station 114 via, for example, WI-FI. In other examples, the process 700 starts with a keypad 108 sending an arm system signal 707 directly to the base station 114 via, for example, an RF transmission (e.g., a sub-GHz transmission). The signals may be encoded as events transmitted in messages. For instance, a user may interact with a customer interface (e.g., the customer interface 132 of FIGS. 1 and 5) hosted by the customer device 122 or a DCS hosted by the keypad 108 to request that a set of location-based devices be armed to provide security to the location.

Continuing with the process 700, the base station 114 sends a system armed signal 710 to one or more location-based devices operating in a low power mode 708 (e.g., one or more security sensors 422, such as the image capture device 500). The signal 710 can be communicated, for example, directly from the base station to the one or more location-based devices via, for example, an RF transmission (e.g., a sub-GHz transmission). In response to receiving the signal 710, the one or more location-based devices (e.g., the image capture device 500) enter an armed state in which the location-based devices monitor the location and will report detected events. In some examples, when operating in the armed state and in the low power mode, the image capture device 500 maintains the PIR sensor 462 and a master control unit (MCU) 902 in an active state, and maintains a system-on-chip (SoC) processor 904 in a powered off state. The MCU 902 and the SoC 904 are described further below with reference to FIG. 9.

Continuing with the process 700, once the system is armed, the image capture device 500 initially operates in a first power mode (e.g., the low power mode 708) of operation. When operating in the low power mode, the image capture device 500 consumes a small amount of power, for example, approximately 1 mA, which increases the overall power consumption efficiency of the image capture device 500. In the low power mode, the PIR sensor 462 within the image capture device 500 monitors for motion within the field of view of the sensor. For instance, changes in the temperature of objects sensed by the PIR sensor 462 that exceed a threshold value can represent motion of people or objects within the field of view. In some examples, the threshold value can be adjusted by the user to increase or decrease the sensitivity of the PIR sensor 462 to changes in the sensed temperatures.

Continuing with the process 700, the image capture device 500 is configured to detect a motion trigger 712 caused by a subject 702, such as a person or object, in the field of view of the PIR sensor 462 while operating in the low power mode. Upon detecting the motion trigger 712 caused by the subject 702, the image capture device 500 enters a second power mode (computer vision (CV) mode 714) tailored to enable the image capture device to determine whether the subject 702 is an actual threat (e.g., a person). In some examples, when entering the CV mode 714, the PIR sensor 462 sends a motion detection signal to the MCU 902, which in turn causes the SoC processor 904 to boot 716 into the CV, or real-time operating system (RTOS), mode of operation 714, and out of the low power mode 708. The CV mode 714 is a mode of operation in which limited operations are performed in real-time, such as image processing (e.g., identifying an object or person in one or more images) and alarm triggering (e.g., generating and transmitting an alarm signal via a radio to a receiving device, such as a base station).

Continuing with the process 700, in the CV mode 714, the SoC processor 904 causes the shutter of an imaging sensor in the at least one sensor assembly 450 to open or to otherwise activate the imaging sensor, allowing the imaging sensor/camera to obtain one or more image frames (e.g., a video). The SoC processor 904 analyzes, in the CV mode 714, the one or more image frames using an object identification process to determine whether a person is in the image frames. If the SoC processor 904 does not identify a person in the image frames, the imaging sensor/camera returns to an idle state and the SoC processor 904 exits the CV mode 714, returning the image capture device 500 to the low power mode 708. However, if the SoC processor 904 identifies a person in the image frames, the SoC processor 904 notifies the MCU 902. The MCU 902, in turn, controls an RF transceiver (e.g., the RF transceiver 404A of FIGS. 4B and 4C) to send a motion trigger signal 718 directly to the base station 114 (e.g., the motion trigger signal is not transmitted via a WI-FI transceiver or other network access point), which also includes an RF radio for communication with the image capture device 500. In addition, the SoC processor 904 causes an audible alarm 726 to sound via the speaker 454 of the image capture device 500.

Continuing with the process 700, the base station 114 sends, via a WI-FI transceiver, an alarm notification 728 to the data center environment 124 for additional processing. For example, the data center environment 124 can generate and transmit a notification 730 to the customer device 122. These notifications may be encoded as an event within one or more messages. In addition, in some examples, the base station 114 communicates a system-in-alarm signal 724 to location-based devices (e.g., the security sensor 422 and/or the keypad 108, where present) installed at its monitored location, thereby putting all of the location-based devices into an alarm state.

Continuing with the process 700, if the SoC processor 904 identifies a person in the image frames, the SoC processor 904 boots 722 into a third mode of operation (a Linux/Virtual Machine (VM) mode of operation 720), which is a time-sharing virtual machine executed by the SoC processor 904. The time-sharing virtual machine mode 720 is distinct from the CV (RTOS) mode 714 in that the time-sharing virtual machine manages the sharing of system resources in non-real-time with a scheduler, data buffers, or fixed task prioritization in a multitasking or multiprogramming environment, whereas in the CV mode 714, the operating system is event-driven and preemptive, meaning the operating system executes tasks according to their priorities rather than based on time.

Continuing with the process 700, in the VM mode 720, the SoC processor 904 causes at least one of the image frames including the person to be uploaded 732 to the data center environment 124 via a WI-FI transceiver. After uploading the image frames, the imaging sensor/camera returns to an idle state and the SoC processor 904 exits the VM mode 720, returning the image capture device 500 to the low power mode 708. The SoC processor 904 informs the MCU 902 that the SoC processor 904 is idling, and the SoC processor 904 is powered off. Subsequent to resumption of low power mode 708, the process 700 may end.

Figure 8A:
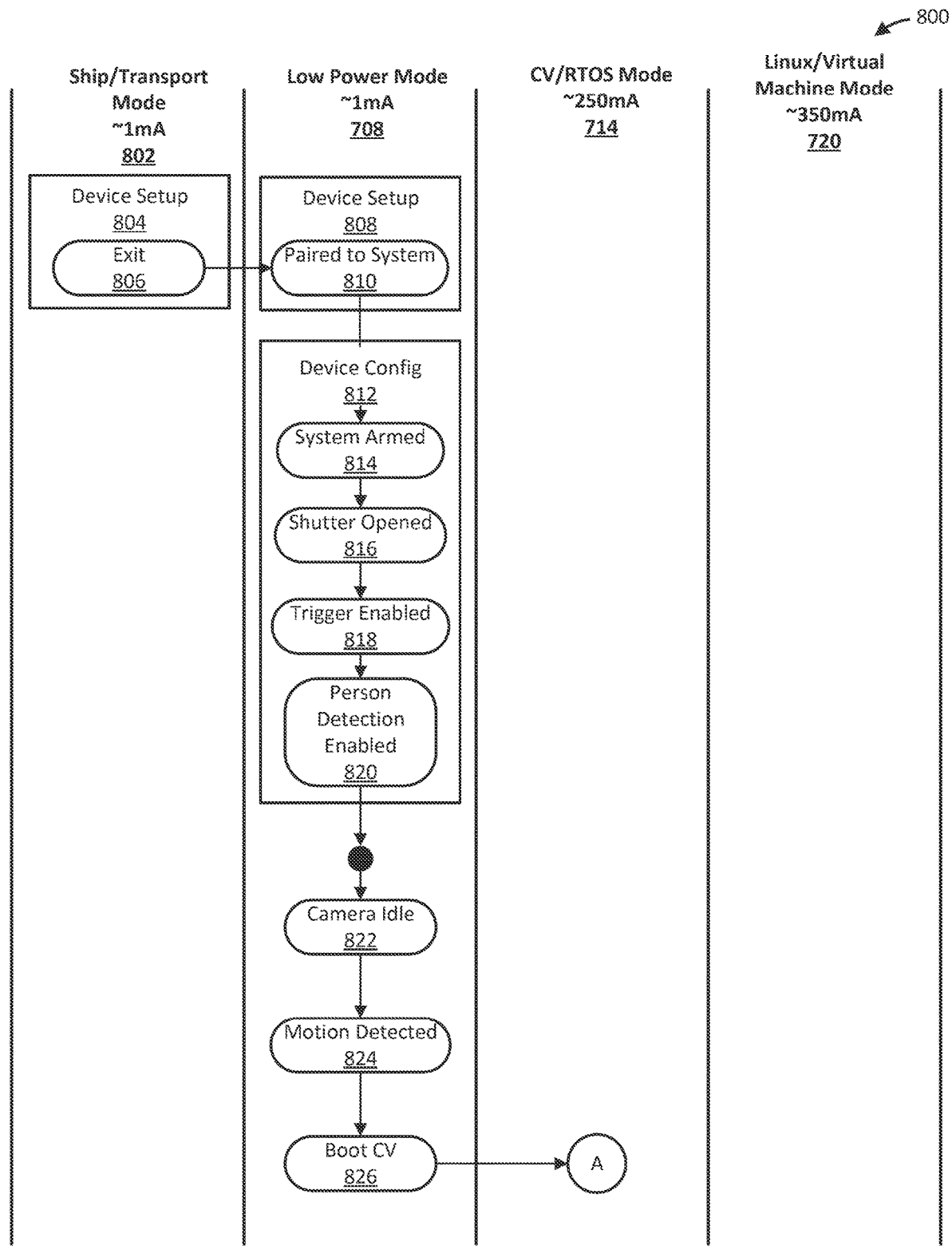
FIGS. 8A and 8B are sequence diagrams of a process for operation of a battery-powered image capture device, according to some examples described herein.
Figure 8B:
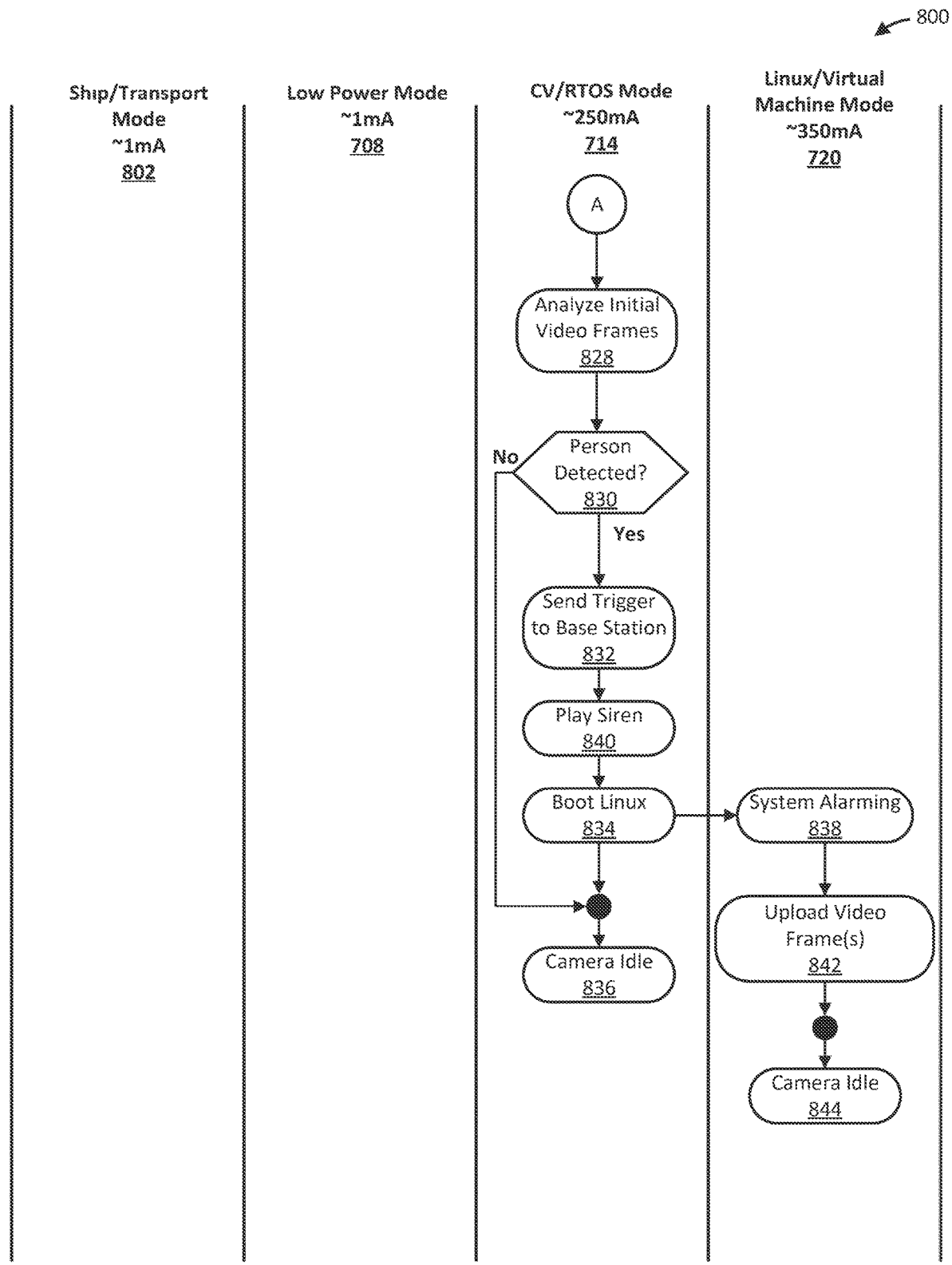

Turning now to FIGS. 8A and 8B, a power control process 800 is illustrated as a sequence diagram. The process 800 can be executed, in some examples, by an image capture device (e.g., the image capture device 500 of FIG. 4B or the image capture device 520 of 4C) under the control of device control system (DCS) code (e.g., the code 408 of FIG. 4B or 4C) implemented by at least one processor (e.g., the processor 400 of FIG. 4B or 4C). The DCS code can include, for example, a camera agent (e.g., the camera agent 138 of FIG. 1).

As shown in FIG. 8A, the process 800 starts with the image capture device being initially setup 804 as a part of its manufacture. For instance, manufacturing personnel may interact with the image capture device to assemble, configure, and/or test its operation. Near the end of its manufacturing process, the image capture device may respond to receipt of input specifying a shutdown request 806 by entering a shipment/transport mode 802. In some examples, the image capture device enters shipment/transport mode 802 by powering off all components and subsystems prior to being packaged for shipment.

Continuing with the process 800, the image capture device is removed from its packaging, installed at a monitored location (e.g., the monitored location 102A of FIG. 1), and setup 808 for operation. In some examples, as part of its setup, the image capture device exits shipment/transport mode 802, enters the low power mode 708, and pairs 810 with or otherwise connects to one or more other location-based devices at the monitored location, such as a base station (e.g., the base station 114 of FIG. 1). It should be noted that, in some examples, to minimize power required for device setup 808 and configuration 812, the image capture device communicates directly with the base station via sub-GHz signals to pair 810 with the base station. In these examples, the image capture device configures itself 812 for operation by enabling person detection 820, enabling alarm triggering 818, opening 816 a shutter of a camera (e.g., the image sensor assembly 450 of FIG. 4B or 4C), and arming 814 itself to detect motion via a PIR sensor (e.g., the PIR sensor 462 of FIG. 4B or 4C).

Continuing with the process 800, the image capture device puts the camera into an idle state 822 until motion is detected 824 (e.g., via the PIR sensor). In response to detection of motion, the image capture device boots 826 into CV mode 714, and with continued reference to FIG. 8B, analyzes initial video frames 828 to determine 830 whether the motion detected was of an actual threat (e.g., a person). If the image capture device does not detect a person in the video frames, the image capture device places 836 the camera back into an idle state and returns to the low power mode 708. If the image capture device detects a person in the video frames, the image capture device sends 832 a trigger signal (e.g., a security event) to the base station, activates 840 a siren (e.g., the speaker 454 of FIG. 4B or 4C), and boots 834 into Linux/VM mode 720, in which all features and functions of the image capture device are available.

Continuing with the process 800, the image capture device receives 838 a system-wide alarm signal from the base station. This alarm signal may be transmitted and received as a via sub-GHz signal via transceivers configured for such communication. In response to reception of the alarm signal, the image capture device uploads 842 video frames to a remote device (e.g., within the data center environment 124 of FIG. 1) for subsequent processing (e.g. summarizing/downscaling and transfer to a customer device, such as the customer device 122 of FIG. 1). After the system alarm is resolved, the image capture device places 844 the camera back into an idle state, returns to the low power mode 708, and the process 800 can end.

Figure 9:
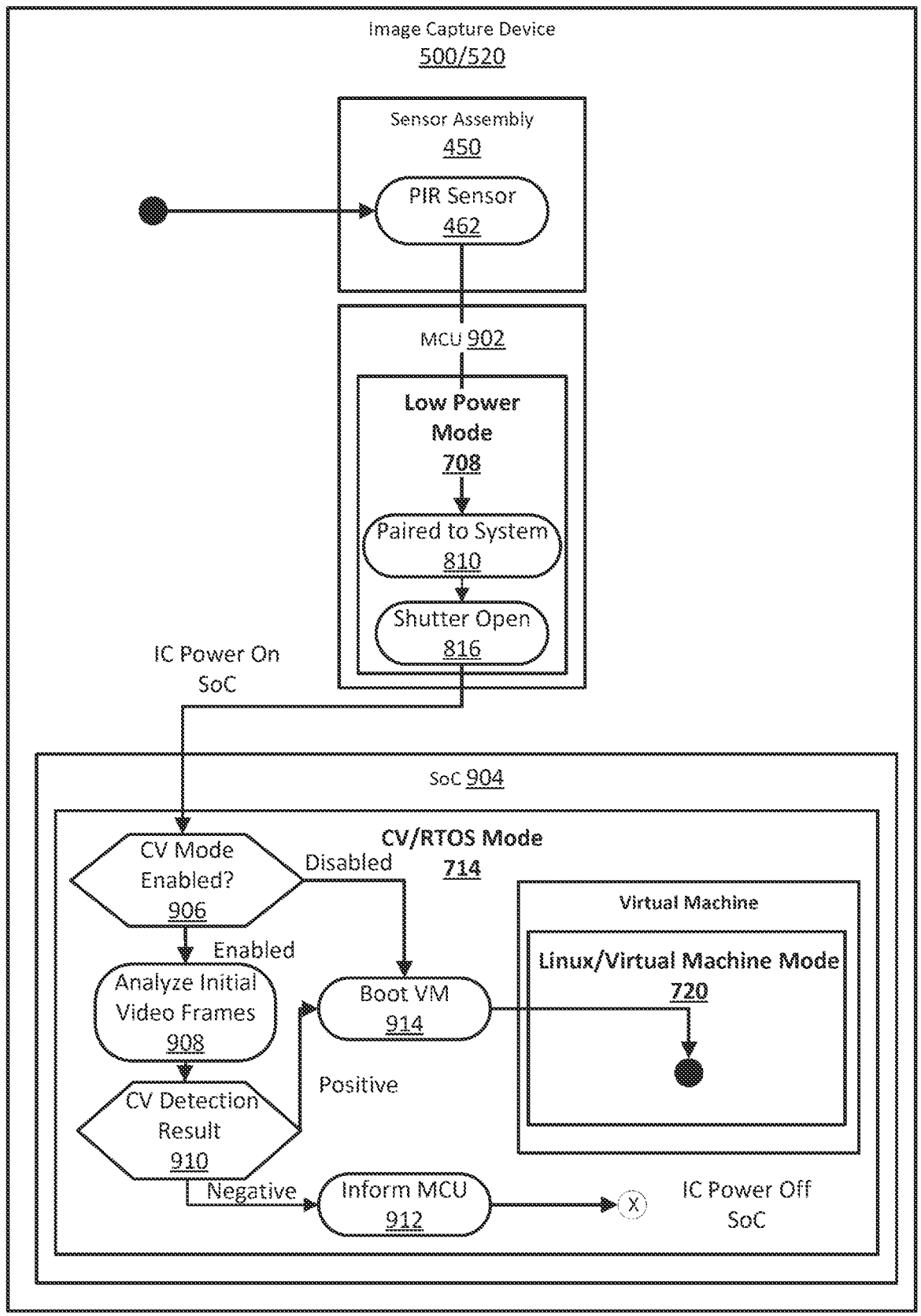
FIG. 9 is a block diagram of a battery-powered image capture device, according to some examples described herein.

Turning now to FIG. 9, a block diagram of a battery-powered image capture device 500/520 is shown. As illustrated in FIG. 9, the device 500/520 includes the PIR sensor 462 of FIG. 4B or 4C within the sensor assembly 450 of FIG. 4B or 4C. Further, in this example, the device 500/520 further includes the MCU 902 and the SoC 904. In some examples, the MCU 902 is or includes a low power microcontroller (e.g., a STM32 model microcontroller available from STMicroelectronics of Geneva, Switzerland or the like) with multiple interrupts that is configured to receive one or more wake up signals from, for example, the PIR sensor 462, a button or some other manually selectable element of a user interface (e.g., the user interface 412 of FIG. 4A), a locally implemented timer, or a wake up signal received via a network interface (e.g., the network interface 404 of FIG. 4B or 4C). In certain examples, the SoC 904 includes a system-on-chip (e.g., a Vi37M SoC available from iCatch of Hsinchu, Taiwan or the like) with memory (e.g., 1 gigabyte or more) and one or more processing cores with processing power (e.g., speed of 1 gigahertz or more) sufficient to perform the functions ascribed to the processor 400 herein. As illustrated in FIG. 9, the MCU 902 is configured to execute the operations 810 and 816 within the low power mode 708. The SoC 904, in turn, is configured to execute the operations 906-912, which are described further below.

As noted above, the PIR sensor 462 and MCU 902 may operate in the low power mode 708 but may lack sufficient image resolution and image processing capability, respectively, to identify objects, such as persons, in the field of view. Thus, the image capture device 500/520 includes additional components, such as the SoC processor 904, to perform object identification and other tasks. However, the SoC processor 904, when powered on and active, consumes additional power. In operation, as noted above, the PIR sensor 462 can output a motion detection signal to the MCU 902 indicating that motion has been detected in response to a positive motion detection result. The signal from the PIR sensor 462 causes the MCU 902 to power on the SoC processor 904, which then boots into the CV mode of operation 714. During the CV mode 714, the image capture device 500/520 consumes more power than during the low power mode 708 but less consumes less power than during the Linux/VM mode 720. For instance, in some examples, the image capture consumes approximately 250 mA when operating in CV mode, at least in part because the SoC processor 904 is powered on and active in the CV mode 714 but is powered off and idle in the low power mode 708.

Continuing with examples illustrated by FIG. 9, the SoC 904 is configured to determine 906 whether the CV mode 714 is enabled or disabled. For instance, the SoC 904 may determine 906 that the CV mode 714 is enabled for execution by determining that a value of a configurable parameter stored in memory is set to a first value (e.g., a predetermined value) and may determine that the CV mode 714 is disabled by determining that the value is set to a second value (e.g., another predetermined value). If the SoC 904 determines 906 that the CV mode 714 is disabled, the SoC 904 boots 914 into the VM mode 720 so that further processing of image data (e.g., person detection by code executing within the virtual machine, or any of the VM mode processes described above) can be executed. If the SoC 904 determines 906 that the CV mode 714 is enabled, the SoC boots to CV mode 714, which allows for limited processing of video frames, and proceeds to the operation 908.

Continuing with examples illustrated by FIG. 9, the SoC 904 is configured to analyze 908 initial video frames to determine whether the images within the video frames depict a threat (e.g., a person). For instance, in some examples, the SoC 904 applies a YOLO person detection process to the initial video frames to determine whether the images depict a person. In some examples, the SoC 904 is further configured to determine 910 whether the operation 908 resulted in a positive or negative threat assessment. If the SoC 904 determines that the operation 908 resulted in a positive assessment, the SoC 904 boots into the VM mode 720 so that further processing of image data (e.g., threat detection by code executing within the virtual machine, or any of the VM mode processes described above) can be executed. If the SoC 904 determines that the operation 908 resulted in a negative assessment, the SoC 904 notifies the MCU 902 that no threat exists and powers off, thereby exiting the CV mode 714 and entering the low power mode 708.

Figure 10:
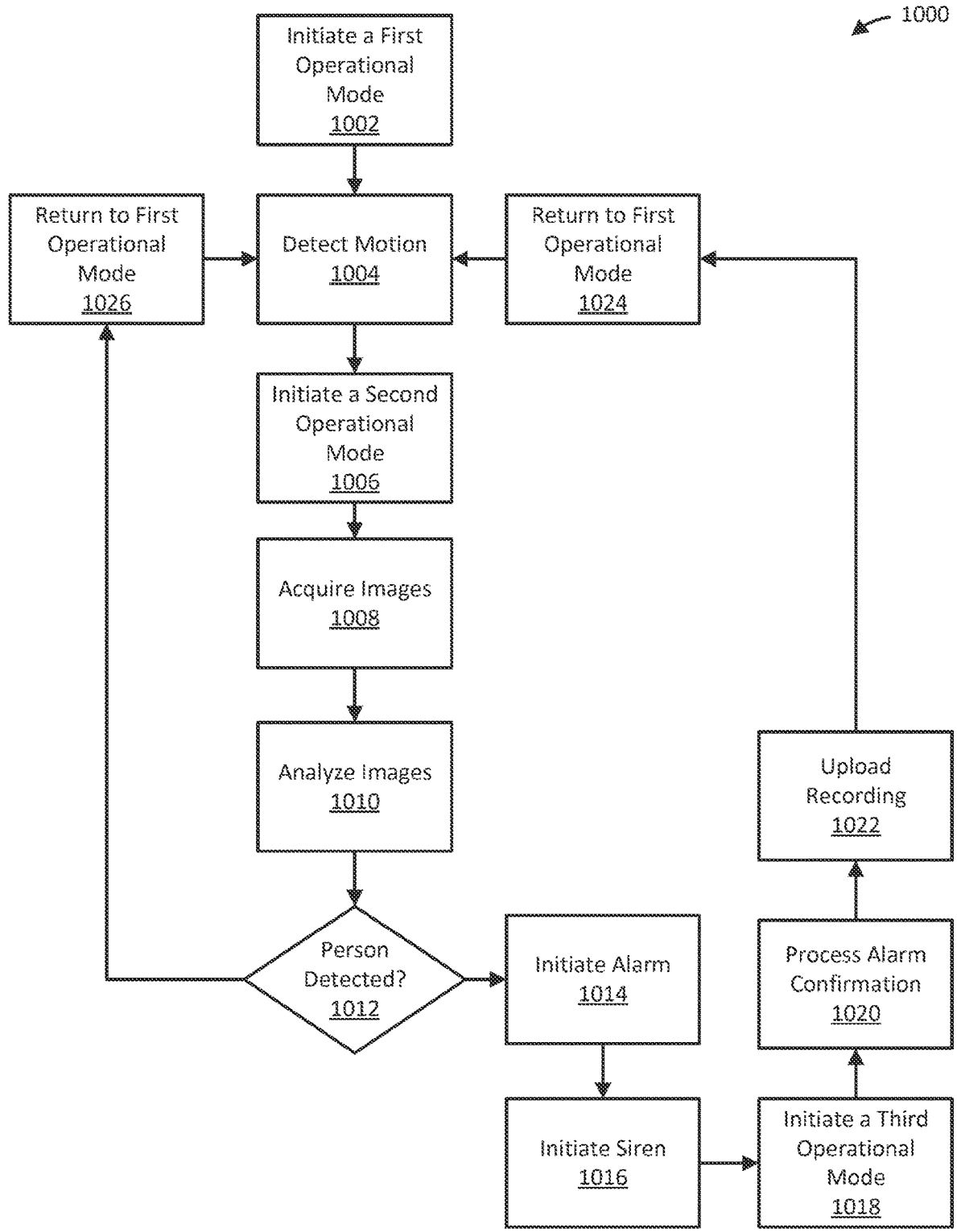
FIG. 10 is a flow diagram of a security event handling process executed by a battery-powered image capture device, according to some examples described herein.

Turning now to FIG. 10, a process 1000 for quickly and efficiently handling a potential security event is illustrated as a flow diagram. In some examples, the process 1000 is executed by a battery-powered image capture device (e.g., the image capture device 500 of FIG. 4B or the image capture device 520 of FIG. 4C) under control of a camera agent (e.g., the camera agent 138 of FIG. 1 or the code 408 of FIG. 4B or 4C).

As shown in FIG. 10, the process 1000 starts with the image capture device initiating 1002 a first mode of operation. For instance, in some examples, the image capture device enters a low power mode of operation (e.g., the low power mode 708 of FIG. 7) in which the image capture device executes the operations 808, 812, and 822 described above with reference to FIG. 8A. As a result of these operations, the image capture device is installed, configured, and ready to monitor a field of view within a location (e.g., the location 102A of FIG. 1). As discussed above, when operating in the low power mode, the image capture device can consume 1 mA or less of battery power. In some examples, the low power mode is effected through use of a microprocessor (e.g., the MCU 902 of FIG. 9) that monitors for one or more wake up signals from a variety of potential sources including a motion detector (e.g., the PIR sensor 462 of FIG. 4B or 4C).

Continuing with the process 1000, the image capture device detects 1004 motion within the field of view. For instance, in some examples, the PIR sensor detects a change in infrared radiation emanating from the field of view and, as a result, transmits a wake up signal to the microprocessor.

Continuing with the process 1000, the image capture device initiates 1006 a second mode of operation. For instance, in some examples, the image capture device enters a CV mode of operation (e.g., the CV mode 714 of FIG. 7) in which the image capture device executes an RTOS to support execution of operations 1008-1016 and 1026 as described below. As discussed above, when operating in the CV mode, the image capture device can consume approximately 250 mA of battery power. In some examples, the CV mode is effected through use of an SoC (e.g., the SoC 904 of FIG. 9) executing in a decreased powered mode supported natively by the SoC.

Continuing with the process 1000, the image capture device acquires 1008 images of the field of view of the image capture device. For instance, in some examples, the image capture device acquires the images via an image sensor housed within an image sensor assembly (e.g., the image sensor assembly 450 of FIG. 4B or 4C).

Continuing with the process 1000, the image capture device analyzes 1010 the images to determine whether the images depict a person. For instance, in some examples, the SoC executes the operation 908 described above with reference to FIG. 9. It should be noted that, within the operation 1010, the SoC executes a process under control of the RTOS, not a multitasking operating system that implements one or more virtual machines.

Continuing with the process 1000, the image capture device determines 1012 whether a person was detected as a result of the operation 1010. For instance, in some examples, the SoC makes this determination, and if a person was detected proceeds to operation 1014. In these examples, if the SoC does not detect a person, the SoC proceeds to operation 1026. Within the operation 1026, the image capture device returns to the first operational mode and proceeds to the operation 1004. For instance, in some examples, the SoC returns the camera to an idle state and powers down the SoC within the operation 1026.

Continuing with the process 1000, the image capture device initiates 1014 a system-wide alarm. For instance, in some examples, the SoC transmits a message directly to another location-based device (e.g., the base station 114 of FIG. 1). It should be noted that, in some examples, this transmission occurs via a sub-GHz wireless channel while the SoC is under control of the RTOS—not a multitasking operating system. This is important in the context of a battery operated image capture device because the SoC boots the RTOS more quickly than a multitasking operating system and consumes less power while running the RTOS vis-à-vis a multitasking operating system. As such, the transmission occurs more quickly and consumes less power when executed under the RTOS than would otherwise be the case under a multitasking operating system.

Continuing with the process 1000, the image capture device initiates 1016 a siren. For instance, in some examples, the SoC sounds a siren via a speaker (e.g., the speaker 454 of FIG. 4B or 4C) incorporated into the image capture device.

Continuing with the process 1000, the image capture device initiates 1018 a third mode of operation. For instance, in some examples, the image capture device enters a VM mode of operation (e.g., the VM mode 720 of FIG. 7) in which the image capture device executes a multitasking operating system to support execution of operations 1020-1024 as described below. As discussed above, when operating in the VM mode, the image capture device can consume approximately 350 mA of battery power. In some examples, the VM mode is effected through use of an SoC (e.g., the SoC 904 of FIG. 9) executing in a normal powered mode supported natively by the SoC. It should be noted that this normal power mode is specific to the SoC. The normal power mode of the SoC contributes to VM mode operation of the image capture device.

Continuing with the process 1000, the image capture device processes 1020 a confirmation of the system-wide alarm. For instance, in some examples, the SoC receives via a network interface (e.g., the network interface 404 of FIG. 4B or 4C) a message (e.g., the alarm signal 724 of FIG. 7) from a distinct device (e.g., a location-based device or a remote device) confirming the system wide alarm initiated in the operation 1014. In response to reception of the message, the SoC may transmit a message, via the network interface, acknowledging reception.

Continuing with the process 1000, the image capture device uploads 1022 a recording that includes the images acquired in the operation 1010 along with other images acquired while the system wide alarm persists. For instance, in some examples, the SoC packages and transmits, via a network interface, a video file or other recording including the images to another location-based device or a remote device (e.g. a customer device 122 of FIG. 1 or a device residing in the monitoring center 120 of FIG. 1).

Continuing with the process 1000, the image capture device returns 1024 to the first operational mode and proceeds to the operation 1004. For instance, in some examples, the SoC returns the camera to an idle state and powers down the SoC within the operation 1024.

Figure 11:
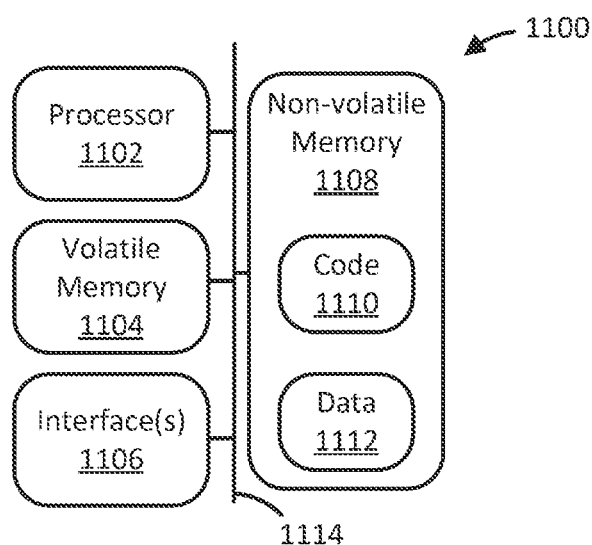
FIG. 11 is a schematic diagram of a computing device, according to some examples described herein.

Turning now to FIG. 11, a computing device 1100 is illustrated schematically. As shown in FIG. 11, the computing device includes at least one processor 1102, volatile memory 1104, one or more interfaces 1106, non-volatile memory 1108, and an interconnection mechanism 1114. The non-volatile memory 1108 includes code 1110 and at least one data store 1112.

In some examples, the non-volatile (non-transitory) memory 1108 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1110 stored in the non-volatile memory can include an operating system and one or more applications or programs that are configured to execute under the operating system. Alternatively or additionally, the code 1110 can include specialized firmware and embedded software that is executable without dependence upon a commercially available operating system. Regardless, execution of the code 1110 can result in manipulated data that may be stored in the data store 1112 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 11, the processor 1102 can be one or more programmable processors to execute one or more executable instructions, such as a computer program specified by the code 1110, to control the operations of the computing device 1100. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1104) and executed by the circuitry. In some examples, the processor 1102 is a digital processor, but the processor 1102 can be analog, digital, or mixed. As such, the processor 1102 can execute the function, operation, or sequence of operations using digital values and/or using analog signals. In some examples, the processor 1102 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1102 that are multicore can provide functionality for parallel, simultaneous execution of instructions or for parallel, simultaneous execution of one instruction on more than one piece of data.

Continuing with the example of FIG. 11, prior to execution of the code 1110 the processor 1102 can copy the code 1110 from the non-volatile memory 1108 to the volatile memory 1104. In some examples, the volatile memory 1104 includes one or more static or dynamic random-access memory (RAM) chips and/or cache memory (e.g. memory disposed on a silicon die of the processor 1102). Volatile memory 1104 can offer a faster response time than a main memory, such as the non-volatile memory 1108.

Through execution of the code 1110, the processor 1102 can control operation of the interfaces 1106. The interfaces 1106 can include network interfaces. These network interfaces can include one or more physical interfaces (e.g., a radio, an ethernet port, a USB port, etc.) and a software stack including drivers and/or other code 1110 that is configured to communicate with the one or more physical interfaces to support one or more LAN, PAN, and/or WAN standard communication protocols. The communication protocols can include, for example, TCP and UDP among others. As such, the network interfaces enable the computing device 1100 to access and communicate with other computing devices via a computer network.

The interfaces 1106 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1110 that is configured to communicate with the user input and/or output devices. As such, the user interfaces enable the computing device 1100 to interact with users to receive input and/or render output. This rendered output can include, for instance, one or more GUIs including one or more controls configured to display output and/or receive input. The input can specify values to be stored in the data store 1112. The output can indicate values stored in the data store 1112.

Continuing with the example of FIG. 11, the various features of the computing device 1100 described above can communicate with one another via the interconnection mechanism 1114. In some examples, the interconnection mechanism 1114 includes a communications bus.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 is a method including causing, by a controller of a device, at least one processor of the device distinct from the controller to power on in response to receipt of a signal from a sensor of the device configured to detect motion within a field of view; analyzing, by the at least one processor, one or more images from an image sensor of the device to identify an image of a person; sending, by the at least one processor, a trigger to a base station in response to identification of the image of the person; and booting, by the at least one processor, a multitasking operating system of the device after sending the trigger to the base station.

Example 2 includes the subject matter of Example 1 and further includes booting, by the at least one processor, a real-time operating system prior to receiving the one or more images; and uploading, by the at least one processor via the multitasking operating system, the one or more images to a remote computing environment.

Example 3 includes the subject matter of Example 2, wherein uploading the one or more images are uploaded to the remote computing environment via a WI-FI transceiver subsequent to booting the multitasking operating system.

Example 4 includes the subject matter of any of Examples 1 through 3 and further includes causing, by the at least one processor, an audible alarm to sound.

Example 5 includes the subject matter of any of Examples 1 through 4 and further includes sending, by the sensor, the signal to the controller while the device is operating in a low power mode in which the at least one processor is powered off to conserve power.

Example 6 includes the subject matter of any of Examples 1 through 5 and further includes causing, by the controller, the image sensor to acquire the one or more images in response to receipt of the signal and while operating in a low power mode in which the at least one processor is powered off.

Example 7 includes the subject matter of any of Examples 1 through 7, wherein sending the trigger comprises sending a trigger directly to the base station via a radio prior to booting the multitasking operating system.

Example 8 is a device comprising a motion sensor; an image sensor; at least one processor; and a controller distinct from the at least one processor and configured to power on the at least one processor in response to reception of a signal from the motion sensor, wherein the at least one processor is operatively coupled to the controller and the image sensor and configured to analyze one or more images from the image sensor to identify an image of a person, send a trigger to a base station in response to identification of the image of the person, and boot a multitasking operating system of the device after sending the trigger to the base station.

Example 9 includes the subject matter of Example 8, wherein the at least one processor is further configured to boot a real-time operating system prior to reception of the one or more images; and upload, via the multitasking operating system, the one or more images to a remote computing environment.

Example 10 includes the subject matter of Example 9, wherein to upload comprises to upload to the remote computing environment via a WI-FI transceiver subsequent to booting the multitasking operating system.

Example 11 includes the subject matter of any of Examples 8 through 10, wherein the at least one processor is further configured to cause an audible alarm to sound.

Example 12 includes the subject matter of any of Examples 8 through 11, wherein the motion sensor is configured to detect motion represented by variations in temperature over time within a field of view of the motion sensor.

Example 13 includes the subject matter of any of Examples 8 through 13, wherein the motion sensor is further configured to send the signal to the controller while the device operates in a low power mode in which the at least one processor is powered off to conserve power.

Example 14 includes the subject matter of any of Examples 8 through 13, wherein the controller is further configured to cause the image sensor to acquire the one or more images in response to reception of the signal and while the device operates in a low power mode in which the at least one processor is powered off.

Example 15 includes the subject matter of any of Examples 8 through 14, wherein to send the trigger comprises to send a trigger directly to the base station via a radio prior to booting a multi-tasking operating system.

Example 16 includes the subject matter of any of Examples 8 through 15, wherein the motion sensor includes a passive infrared sensor.

Example 17 is a method comprising detecting, by a device powered by a battery, motion of an object; processing, by the device, one or more images in response to the detection of the motion; providing, by the device, a radio frequency (RF) signal directly to a security system, the RF signal configured to cause the security system to enter a state of alarm; and booting, by the device, an operating system of the device after provision of the RF signal to the security system to enable the device to perform a security operation.

Example 18 includes the subject matter of Example 17, wherein processing the one or more images comprises identifying the object as a person using the images.

Example 19 includes the subject matter of either Example 17 or Example 18, wherein the operating system comprises a multitasking operating system.

Example 20 includes the subject matter of any of Examples 17 through 19, wherein the security operation comprises uploading the one or more images to a remote device.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:
causing, by a controller of a device, at least one processor of the device distinct from the controller to power on in response to receipt of a signal from a sensor of the device configured to detect motion within a field of view;
after receiving the signal from the sensor, booting, by the at least one processor, a real-time operating system;
analyzing, by the at least one processor, one or more images from an image sensor of the device to identify an image of a person;
sending, by the at least one processor, a trigger to a base station in response to identification of the image of the person;
after booting the real-time operating system, causing, by the at least one processor, an audible alarm to sound; and
booting, by the at least one processor, a multitasking operating system of the device after sending the trigger to the base station and after causing the audible alarm to sound.

2. The method of claim 1, further comprising:
after booting the real-time operating system, but prior to booting the multitasking operating system, receiving the one or more images; and
after booting the multitasking operating system, uploading, by the at least one processor via the multitasking operating system, the one or more images to a remote computing environment.

3. The method of claim 2, wherein the one or more images are uploaded to the remote computing environment via a WI-FI transceiver subsequent to booting the multitasking operating system.

4. The method of claim 1, further comprising sending, by the sensor, the signal to the controller while the device is operating in a low power mode in which the at least one processor is powered off to conserve power.

5. The method of claim 1, further comprising causing, by the controller, the image sensor to acquire the one or more images in response to receipt of the signal and while operating in a low power mode in which the at least one processor is powered off.

6. The method of claim 1, wherein sending the trigger comprises sending the trigger to the base station via a radio prior to booting the multitasking operating system.

7. A device comprising:
a motion sensor;
an image sensor;
at least one processor; and
a controller distinct from the at least one processor and configured to power on the at least one processor in response to reception of a signal from the motion sensor, wherein the at least one processor is operatively coupled to the controller and the image sensor and configured to
after receiving the signal from the motion sensor, boot a real-time operating system,
analyze one or more images from the image sensor to identify an image of a person,
send a trigger to a base station in response to identification of the image of the person,
after booting the real-time operating system, cause an audible alarm to sound, and
boot a multitasking operating system of the device after sending the trigger to the base station and after causing the audible alarm to sound.

8. The device of claim 7, wherein the at least one processor is further configured to:
after booting the real-time operating system, but prior to booting the multitasking operating system, receive the one or more images; and
after booting the multitasking operating system, upload, via the multitasking operating system, the one or more images to a remote computing environment.

9. The device of claim 8, wherein to upload comprises to upload to the remote computing environment via a WI-FI transceiver subsequent to booting the multitasking operating system.

10. The device of claim 7, wherein the motion sensor is configured to detect motion represented by variations in temperature over time within a field of view of the motion sensor.

11. The device of claim 7, wherein the motion sensor is further configured to send the signal to the controller while the device operates in a low power mode in which the at least one processor is powered off to conserve power.

12. The device of claim 7, wherein the controller is further configured to cause the image sensor to acquire the one or more images in response to reception of the signal and while the device operates in a low power mode in which the at least one processor is powered off.

13. The device of claim 7, wherein to send the trigger comprises to send the trigger to the base station via a radio prior to booting the multitasking operating system.

14. The device of claim 7, wherein the motion sensor includes a passive infrared sensor.

15. A method comprising:
detecting, by a device powered by a battery, motion of an object;
generate a signal in response to detecting the motion of the object;
causing, by a controller of the device, at least one processor of the device distinct from the controller to power on in response to the signal;
after the at least one processor is powered on, booting, by the at least one processor, a real-time operating system;
processing, by the at least one processor under control of the real-time operating system, one or more images from an image sensor of the device to identify an image of a person;
sending, by the at least one processor, under control of the real-time operating system, a radio frequency (RF) signal directly to a security system in response to identification of the image of the person;
causing, by the at least one processor, under control of the real-time operating system, an audible alarm to sound; and
booting, by the at least one processor, a multitasking operating system of the device after provision of the RF signal to the security system, and after causing the audible alarm to sound.

16. The method of claim 15, wherein processing the one or more images comprises identifying the object as the person using the one or more images.

17. The method of claim 15, further comprising, after booting the multitasking operating system, uploading, by the at least one processor via the multitasking operating system, the one or more images to a remote device.

* * * * *